(12) United States Patent
Schmidt et al.

(10) Patent No.: US 7,781,926 B2
(45) Date of Patent: Aug. 24, 2010

(54) ELECTRIC MOTOR AND SERIES OF ELECTRIC MOTORS

(75) Inventors: Josef Schmidt, Graben-Neudorf (DE); Günter Becker, Östringen (DE); Jochen Pfann, Karlsruhe (DE); Karl-Heinz Tröndle, Forst (DE)

(73) Assignee: Sew-Eurodrive GmbH & Co. KG, Bruchsal (DE)

( * ) Notice: Subject to any disclaimer, the term of this patent is extended or adjusted under 35 U.S.C. 154(b) by 666 days.

(21) Appl. No.: 11/547,112

(22) PCT Filed: Feb. 18, 2005

(86) PCT No.: PCT/EP2005/001732

§ 371 (c)(1), (2), (4) Date: Oct. 2, 2006

(87) PCT Pub. No.: WO2005/107042

PCT Pub. Date: Nov. 10, 2005

(65) Prior Publication Data

US 2007/0210661 A1    Sep. 13, 2007

(30) Foreign Application Priority Data

Apr. 1, 2004 (DE) ........................ 10 2004 016 781
Jul. 13, 2004 (DE) ........................ 10 2004 033 745

(51) Int. Cl.
H02K 11/00 (2006.01)
(52) U.S. Cl. .......................................... 310/77; 310/89
(58) Field of Classification Search .................. 310/89, 310/90, 52–64, 76, 77, 93
See application file for complete search history.

(56) References Cited

U.S. PATENT DOCUMENTS 4,496,864 A * 1/1985 Apetrei et al. ................. 310/77
4,589,534 A * 5/1986 Apetrei et al. ............ 192/18 B (Continued)

FOREIGN PATENT DOCUMENTS

DE       197 04 226       8/1998

(Continued)

OTHER PUBLICATIONS

International Search Report from International Patent Application No. PCT/EP2005/001732, Sep. 6, 2005.

(Continued)

Primary Examiner—Dang D Le
(74) Attorney, Agent, or Firm—Kenyon & Kenyon LLP

(57) ABSTRACT

An electric motor and modular system of electric motors includes at least a stator, rotor, and a housing, the modular system including several variants of electric motors, e.g., within one size, the housing having a mechanical interface that is arranged for connection to a bearing support, the bearing support including at least a bearing seat for the B-side bearing of the rotor shaft, at least two different bearing supports being alternatively connectable to the housing, a first bearing support including an additional interface for connection to a bottom part of a terminal box, or alternatively to a bottom part for power electronics, and the first bearing support forming a housing for a brake and/or a fan, a second bearing support being constructed in one piece with a bottom part of a terminal box.

12 Claims, 12 Drawing Sheets

U.S. PATENT DOCUMENTS

| | | | |
|---|---|---|---|
| 4,643,282 A * | 2/1987 | Edl | 192/18 B |
| 4,988,905 A | 1/1991 | Tolmie, Jr. | |
| 5,360,322 A | 11/1994 | Henein et al. | |
| 5,491,370 A * | 2/1996 | Schneider et al. | 310/54 |
| 5,532,533 A | 7/1996 | Mizutani | |
| 5,674,056 A * | 10/1997 | Yamamoto et al. | 417/366 |
| 5,780,946 A * | 7/1998 | Nakamura et al. | 310/58 |
| 5,814,909 A * | 9/1998 | Yamada et al. | 310/64 |
| 6,011,331 A | 1/2000 | Gierer et al. | |
| 6,198,183 B1 * | 3/2001 | Baeumel et al. | 310/52 |
| 6,229,232 B1 | 5/2001 | Roth-Stielow et al. | |
| 6,459,182 B1 * | 10/2002 | Pfann et al. | 310/77 |
| 6,707,183 B2 * | 3/2004 | Breynaert et al. | 310/68 B |
| 6,707,185 B2 * | 3/2004 | Akutsu et al. | 310/71 |
| 7,122,923 B2 * | 10/2006 | Lafontaine et al. | 310/58 |
| 2001/0033113 A1 | 10/2001 | Takano | |

FOREIGN PATENT DOCUMENTS

| | | |
|---|---|---|
| EP | 0 456 169 | 11/1991 |
| EP | 0 874 442 | 10/1998 |
| EP | 1 589 638 | 10/2005 |
| GB | 989 720 | 4/1965 |

OTHER PUBLICATIONS

International Preliminary Report on Patentability from International Patent Application No. PCT/EP2005/001732, Nov. 9, 2006.

Translation of Written Opinion of the International Searching Authority, International Patent Application No. PCT/EP2005/001732, Sep. 6, 2005.

* cited by examiner

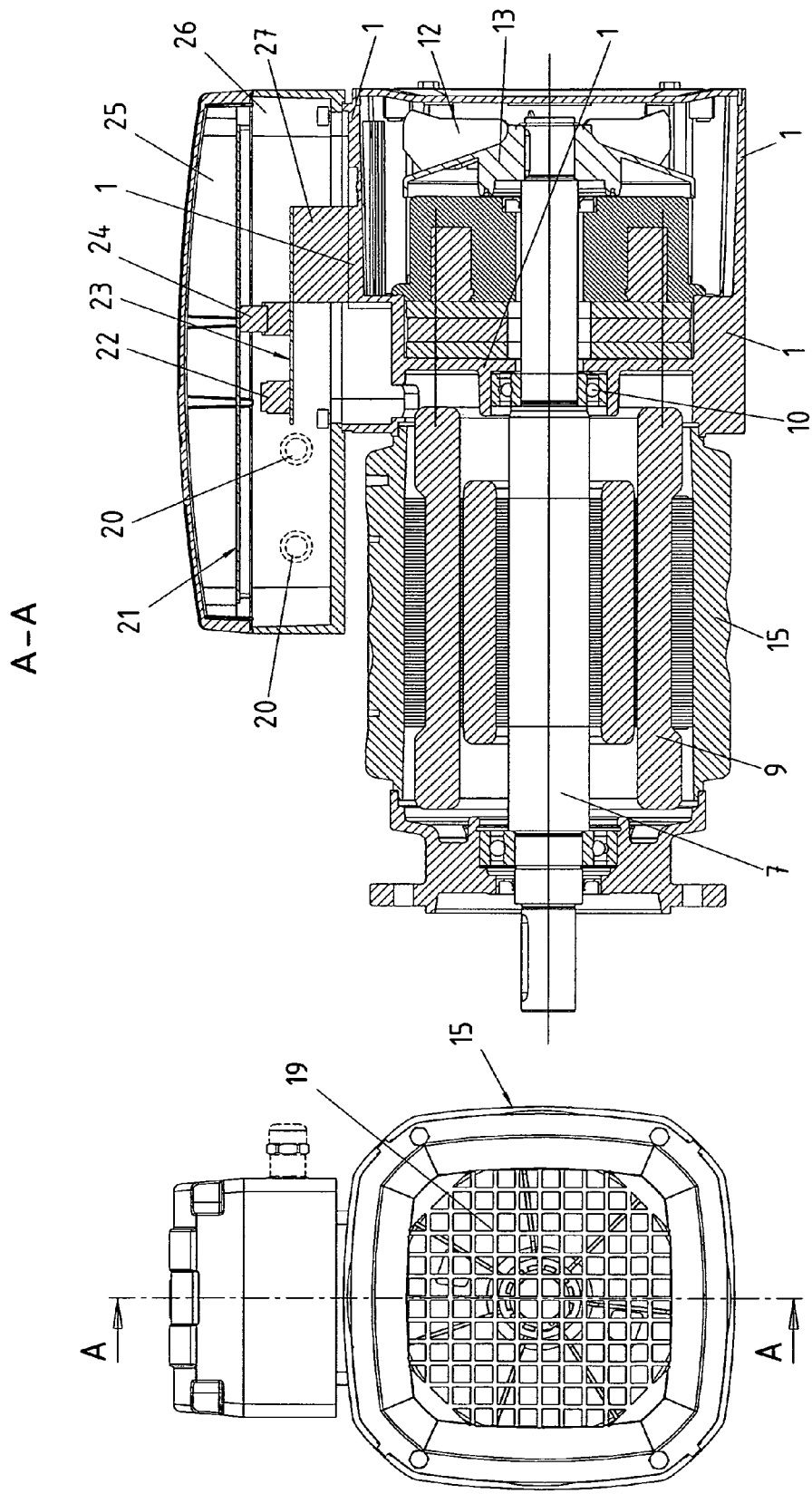

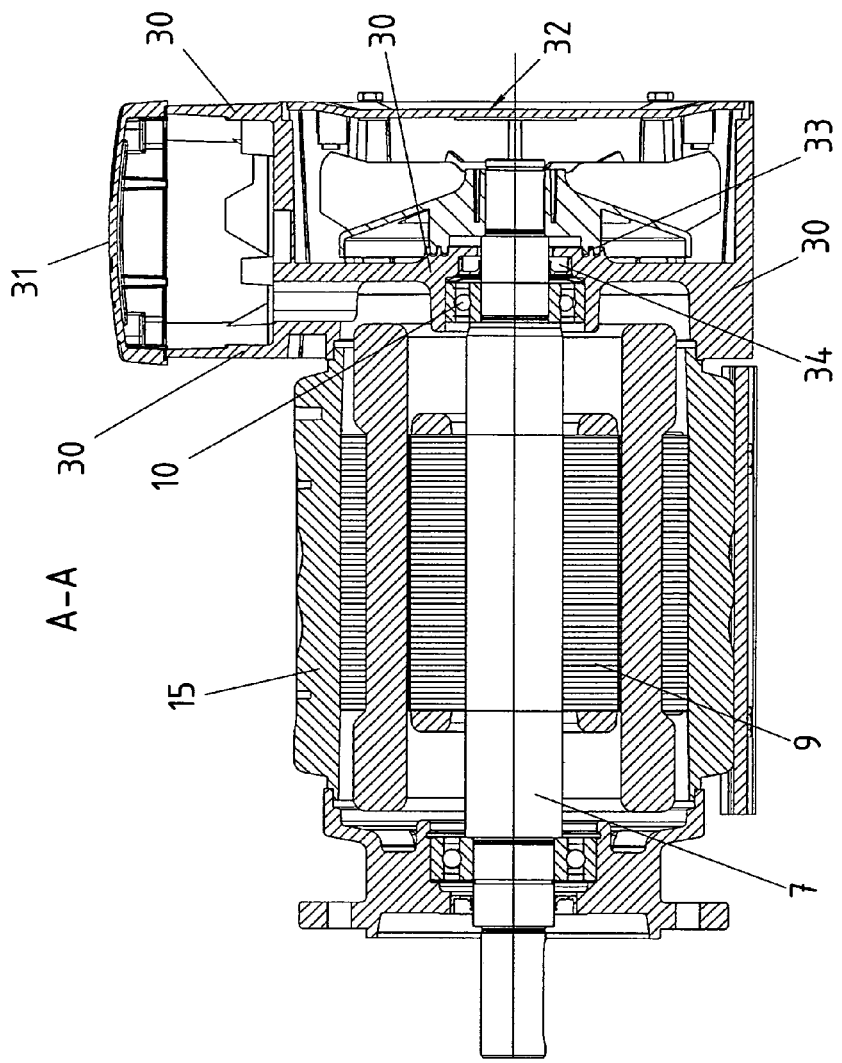
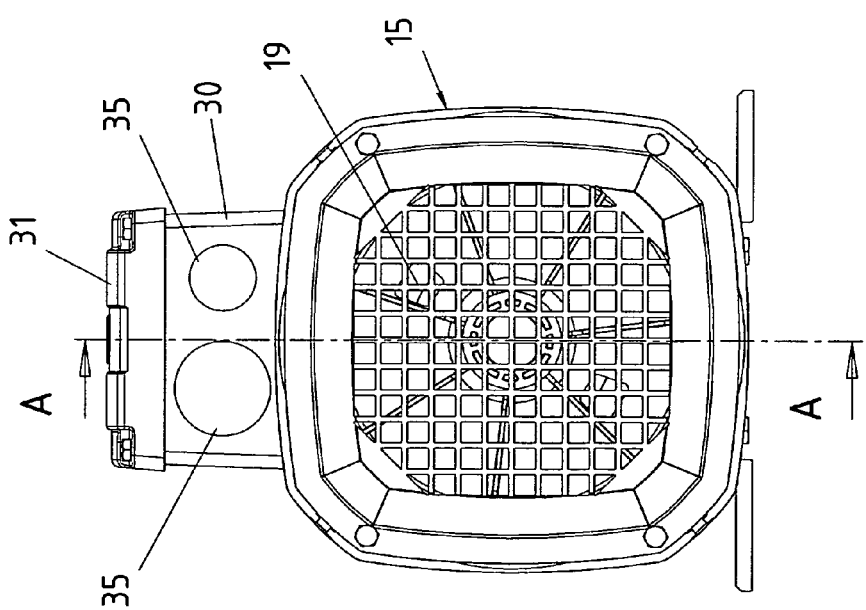
Fig. 3b
Fig. 3a

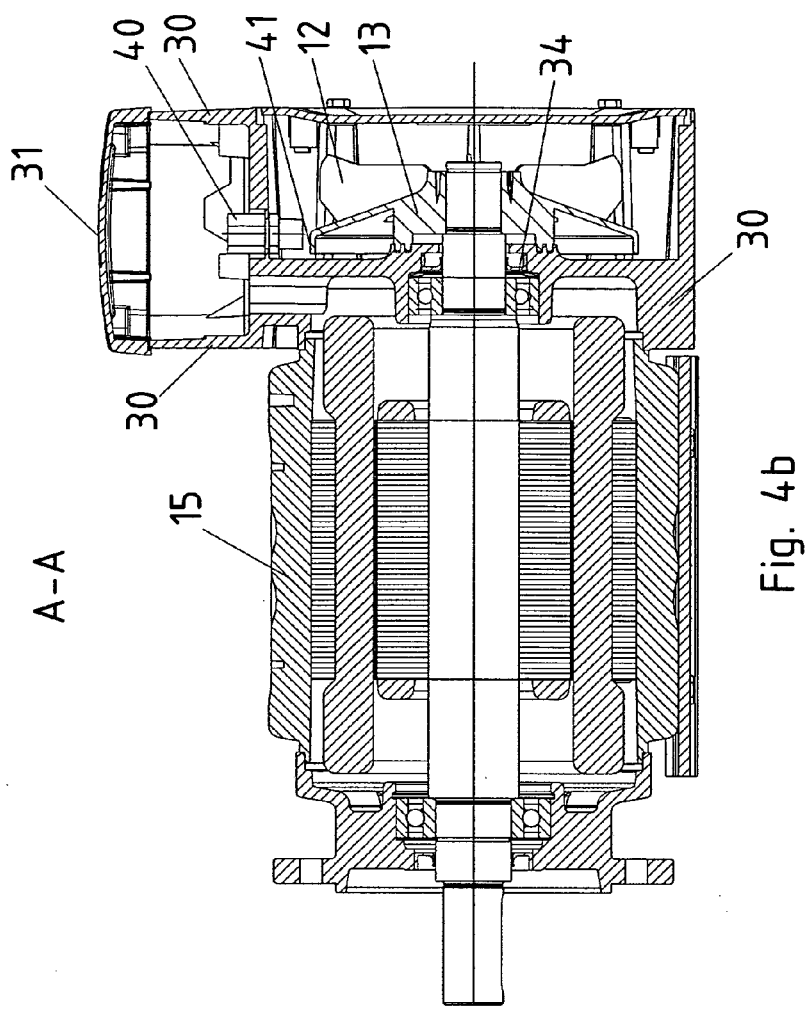
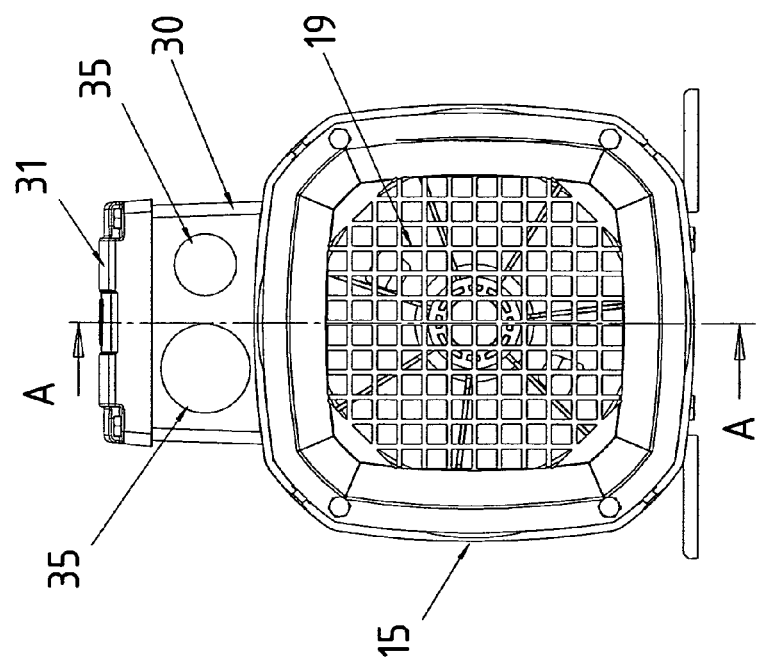
Fig. 4b
Fig. 4a

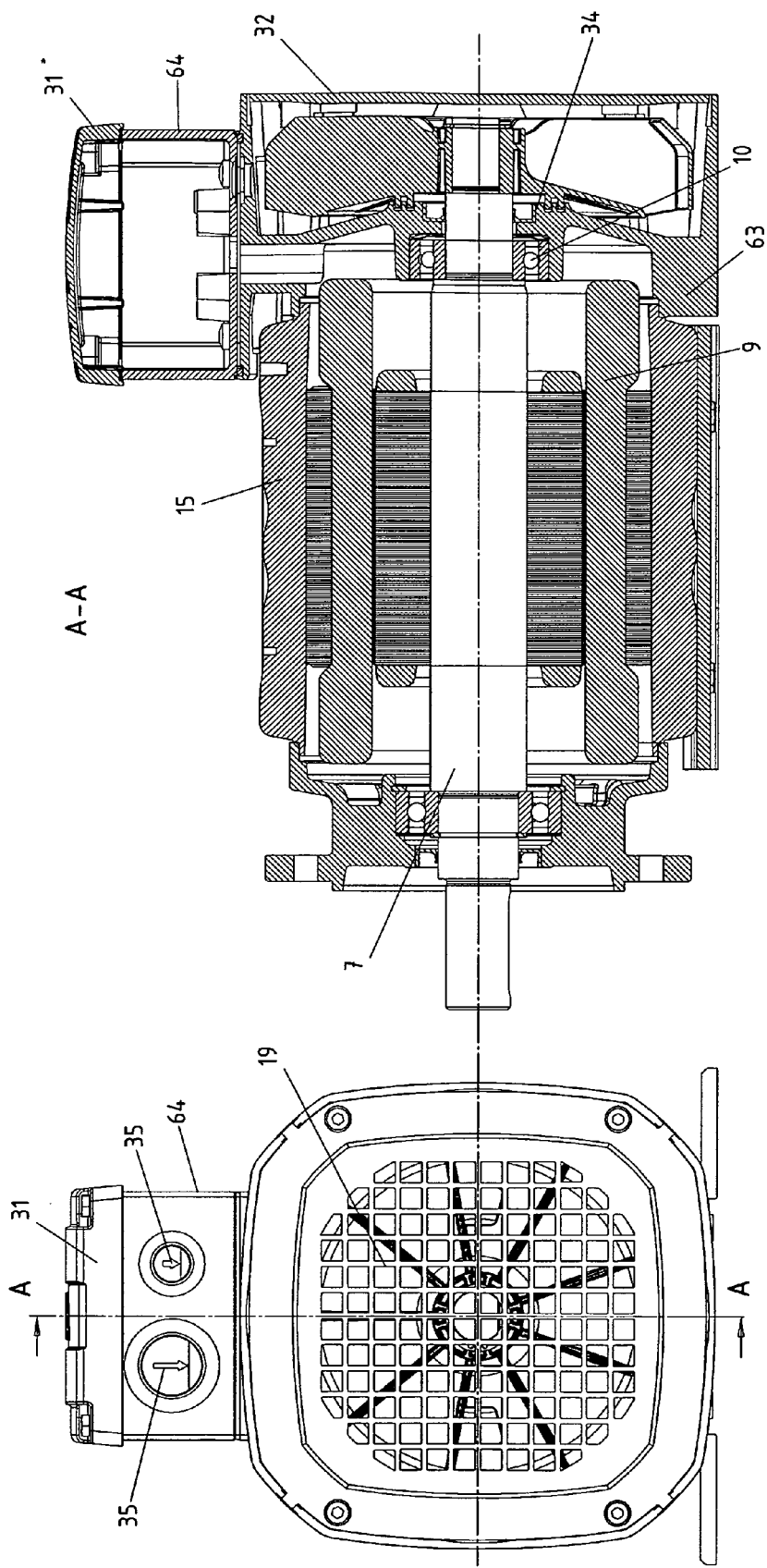

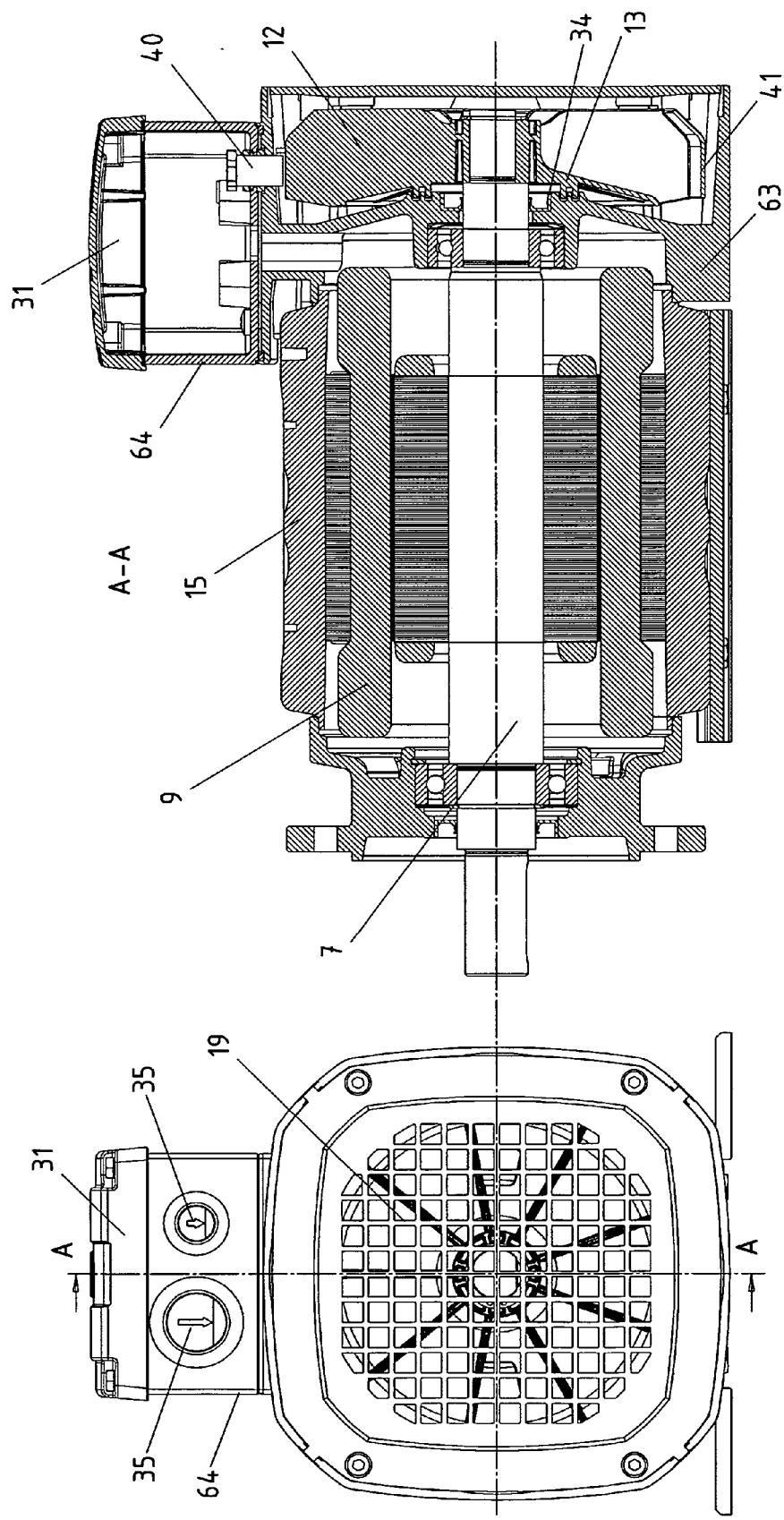

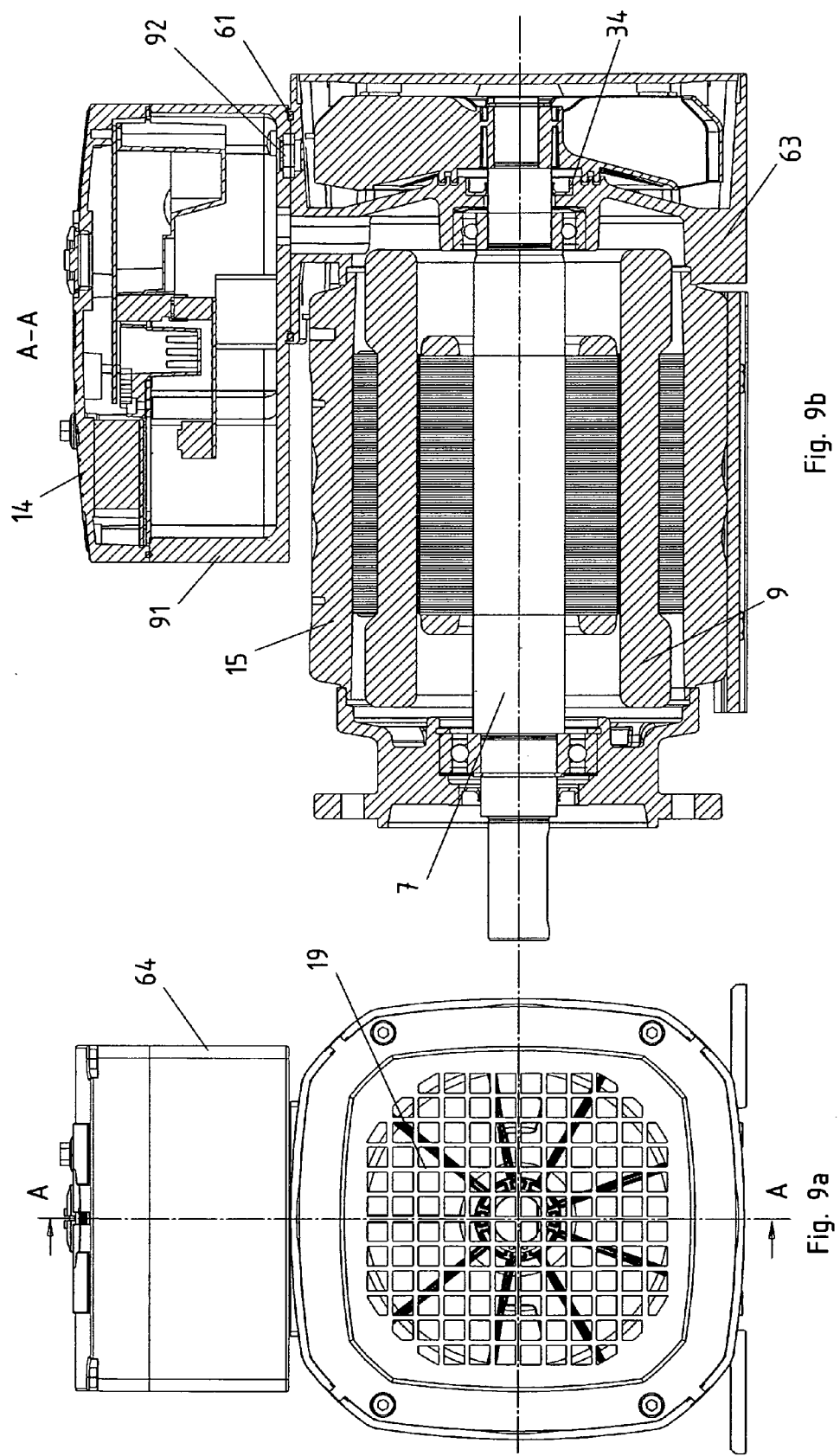

ELECTRIC MOTOR AND SERIES OF ELECTRIC MOTORS

FIELD OF THE INVENTION

The present invention relates to an electric motor and a series of electric motor(s).

BACKGROUND INFORMATION

German Published Patent Application No. 197 04 226 describes an electric motor, where an adapter and a cover are put onto the housing of the stator, an electronic circuit having the functionality of a converter being provided in the interior chamber. In this context, it is disadvantageous that the converter is thermally insulated in the direction of the motor. Consequently, a high-power cooling body must be connected to the converter. This cooling body is provided on the converter in the direction of the motor and disadvantageously requires a large unit volume. It is also difficult and expensive to manufacture. In particular, a design having cooling fingers is associated with high expenditure.

The terminal box, i.e., connection box, of the electric motor is not axially mounted, but laterally. However, in the case of some systems, there is little space available on the side of the motor.

SUMMARY

Example embodiments of the present invention may provide an electric motor and a series of electric motors that includes different variants. In this context, however, the storage volumes and the costs may become reducible.

According to an example embodiment of the present invention, an electric motor includes at least a stator, a rotor, and a housing, the housing having at least one first mechanical interface that is provided for connection to a bearing support, the bearing support including at least a bearing seat for the B-side bearing of the rotor shaft, the bearing support including a further interface for connection to a bottom part, the bearing support forming a housing, e.g., for a brake and/or a fan, the bottom part having an interface for connection to a cover, the bottom part forming a housing for at least power electronics, whose heat may be discharged directly, or at least indirectly, to the bottom part, the bottom part being connected to the bearing support in a thermally conductive manner, so that the heat of the power electronics may be discharged by the bearing support to the surrounding air.

In this context, it may be provided that no special cooling body is necessary, but that the B-side bearing support of the electric motor may be used for dissipating heat. Consequently, the entire electric motor may be designed to be more compact, and, e.g., the lateral space is small.

In this context, power electronics should be understood to be at least the part of the electronic components that may control, e.g., switch, the motor currents. For a deliverable motor output of greater than 500 W, a power-electronics heat loss of greater than 20 W, e.g., up to 300 W, normally occurs, which is to be ultimately discharged to the environment. The heat loss to be dissipated increases by a value between 20 and 80 Watt per kW of motor output.

In a modular system, the electric motors include at least a stator, rotor, and a housing, the modular system including several variants of electric motors, e.g., within one size, the housing having a mechanical interface that is designed for connection to a bearing support, the bearing support including at least a bearing seat for the B-side bearing of the rotor shaft, at least two different bearing supports being alternatively connectible to the housing, a first bearing support including an additional interface for connection to a bottom part of a terminal box, or alternatively to a bottom part for power electronics, and the first bearing support forming a housing for a brake and/or a fan, a second bearing support being constructed in one piece with a bottom part of a terminal box.

It may be provided that many different variants may be produced using as few components as possible. A variant, which is as compact as possible, is obtainable for each functional requirement, using as few components as possible. The modular system, i.e., the series, may only provide bearing supports having different interfaces. The housing of the stator remains unchanged. Therefore, it is usable in all of the variants of the series. The interfaces of the bearing support to the housing of the stator allows different bearing supports to be attached. In the case of one of these bearing supports, a terminal box may be integrated. In the case of another, it is detachably connectible and may be alternatively replaced with a converter. The last-named interface to the terminal box may even be oriented to be offset 90° from the interface to the stator. Therefore, it does not have to be coaxially mounted.

The B-side bearing support, and not the housing of the stator, may be used for variation within the series. It not only allows the stator and rotor plates to be constructed in a substantially identical manner, but also allows, depending on the requirement, different unit volumes of the bearing support to be obtained, together with the terminal box or the converter housing, in the B-side region. However, in the majority of the machines and systems in which electric motors are installed, more volume is available in the B-side region than in the A-side region or in the region over the front axial, i.e., A-side, region of the stator housing. In addition, for maintenance work, easier access is possible in the B-side region than in the A-side region.

The connections may be constructed to be impervious and detachable, using seals. Therefore, a high degree of protection is achievable, e.g., at least IMP.

The interfaces of the bearing support are provided for mechanical connection to the above-mentioned parts. In addition, the bearing support also has other functions, e.g., the function of discharging heat of the power electronics from the interior chamber of the terminal box or converter. In each case, the bearing support may always carry out the function of forming a housing for a fan rotating with the rotor shaft. This supplies cool surrounding air and consequently increases the heat flowing from the bearing support to the environment.

A further integrated function of the bearing support is to act as the guide device for the armature disk and friction disk of the optionally present brake in the axial direction. Therefore, the bearing support unites the mechanical functions of the retention force for the B-side bearing and the mechanical guide forces for the components of the brake, such as the armature disk, etc.

A housing cover may be connected to the bottom part, and a bottom part of a terminal box or bearing support may be connected to a one-piece lower part of a terminal box. In this context, it may be provided that an interior region sealed off to have a high degree of protection may be provided for sensitive electronics.

The lower part or lower part of a terminal box may be connected to the bearing support in at least two different orientations, e.g., in orientation directions offset 90° from one another. It may be provided that the optimum orientation may be selected as a function of the requirement of the application, i.e., the type of construction of the machine or system.

Soft-start electronics may be provided instead of the converter electronics. It may be provided that costs are reducible, since the developmental expenditure of soft-start electronics is less, and they may also be manufactured using fewer components.

At least the first bearing support may have a precision-machined contact surface for connecting it to the power electronics in a thermally conductive manner. In this context, it may be provided that the bearing support may be used as a mechanical mount and heat-dissipating device.

The power electronics may be connected to the bearing support in a thermally conductive manner for discharging heat to the environment. It may be provided that the heat is discharged to a part that may be cooled by a stream of cooling air.

The second bearing support may be arranged to have a sensor, which detects, at the circumference of the fan, physical characteristics of the fan or of a component connected to it. It may be provided that the fan has a larger diameter than the rotor shaft, and that the angular resolution may be consequently improved. In addition, no expensive, complicated sensor system is necessary, but rather a magnetic ring or a magnetic foil is sufficient.

The first bearing support may form a housing for an electromagnetically operable brake and/or a fan. It may be provided that the bearing support is cooled. In addition, an additional housing for the brake is not necessary.

The first and second bearing supports may each be connectible to the same kind of fan-hood grating. An advantage of this is that the same fan-hood grating may be used repeatedly within the series.

The housing of the stator may be connectible to a bearing support on the A-side, the bearing support including a bearing seat for accommodating the A-side bearing of the rotor shaft. It may be provided that the entire electric motor has three main housing parts, namely the housing of the stator and the two bearing supports. If an electric motor having a larger torque is necessary, only the rotor shaft, together with the rotor, the stator, and the housing of the stator, is to be exchanged for, e.g., parts that are axially longer, the remaining parts being able to be retained.

The bearing support may have guide devices for axially guiding the armature disk of the brake. In particular, the guide devices are arranged as cut-outs. It may be provided that no special part is necessary for carrying out the guide function, but that this function may be integrated into the bearing support.

Further aspects and features of example embodiments of the present invention are described in more detail below with reference to the appended Figures.

LIST OF REFERENCE CHARACTERS 1 bearing support
2 armature disk
3 magnet body
4 bottom part of terminal box, bottom part of connection box
5 coating support
6 stator winding
7 rotor shaft
8 A-side bearing
9 rotor
10 B-side bearing
11 friction disk
12 fan blade
13 fan
14 housing cover
15 housing
16 seal
17 seal
18 screw-type conduit fittings as cable outlets
19 fan-hood grating
20 screw-type conduit fitting
21 printed circuit board
22 connection terminals
23 printed circuit board
24 electrical connector including plug and mating connector
25 housing cover
26 bottom part
27 power electronics
30 bearing support
31 housing cover
32 fan-hood grating
33 labyrinth seal
34 shaft sealing ring
35 screw-type conduit fittings
40 sensor
41 magnetic foil that is applied to the fan
51 depressions for labyrinth seal
52 knockout
53 cut-outs
61 seal
62 knockout
63 bearing support
64 terminal box
91 bottom part

BRIEF DESCRIPTION OF THE DRAWINGS

FIGS. 2a and 2b are a plan view and sectional view of an electric motor of an example embodiment of the present invention, having a brake and fan, where a bottom part replacing the terminal box is provided, the bottom part, together with the attachable cover, surrounding electronics that function as a converter.

FIGS. 3a and 3b are a plan view and sectional view of an electric motor of an example embodiment of the present invention, having a brake and a fan, the terminal box being formed in one piece with the B-side bearing support.

FIGS. 4a and 4b are a plan view and sectional view of an electric motor of an example embodiment of the present invention, having a brake and a fan, the terminal box being formed in one piece with the B-side bearing support, and the fan supporting a sensor ring that is detectable by a sensor.

Figure 6A:
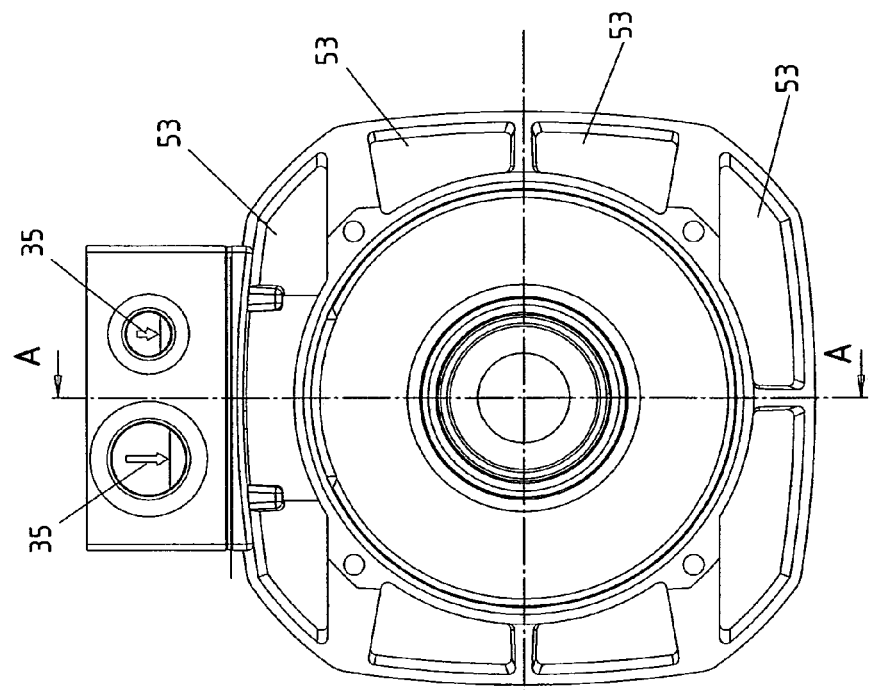
Figure 6B:
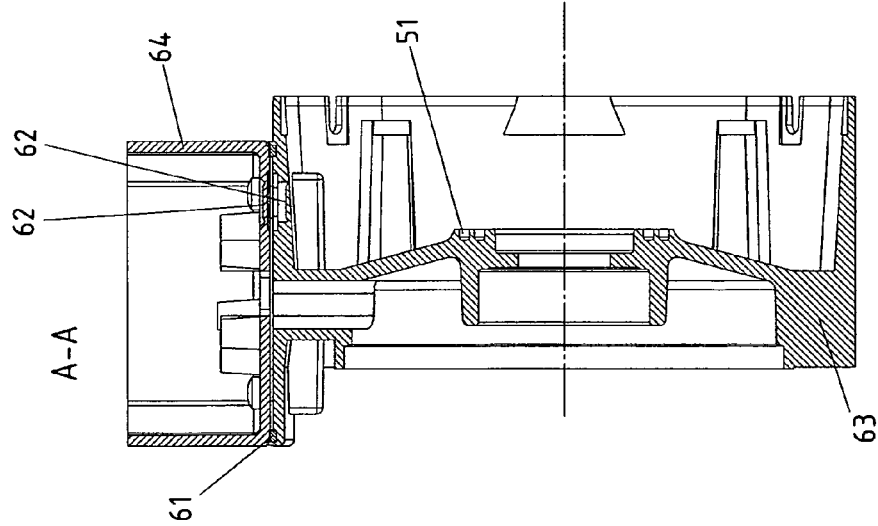

The bearing support, along with a connected terminal box, is illustrated in FIGS. 6a and 6b.

A corresponding electric motor is illustrated in FIGS. 7a and 7b.

A sensor is additionally illustrated in FIGS. 8a and 8b.

An electric motor having a fan, but not a brake, is illustrated in FIGS. 9a and 9b.

Figure 10B:
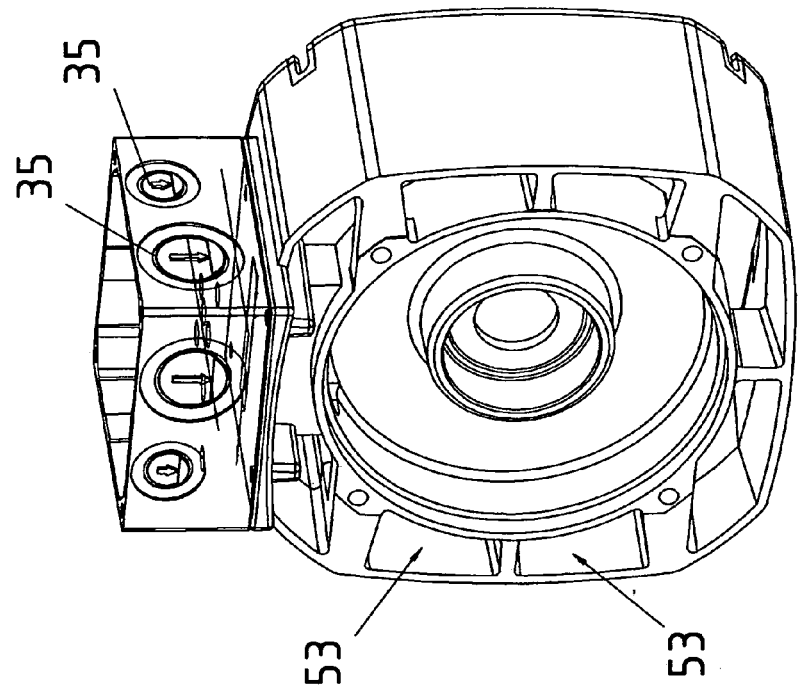
Figure 10A:
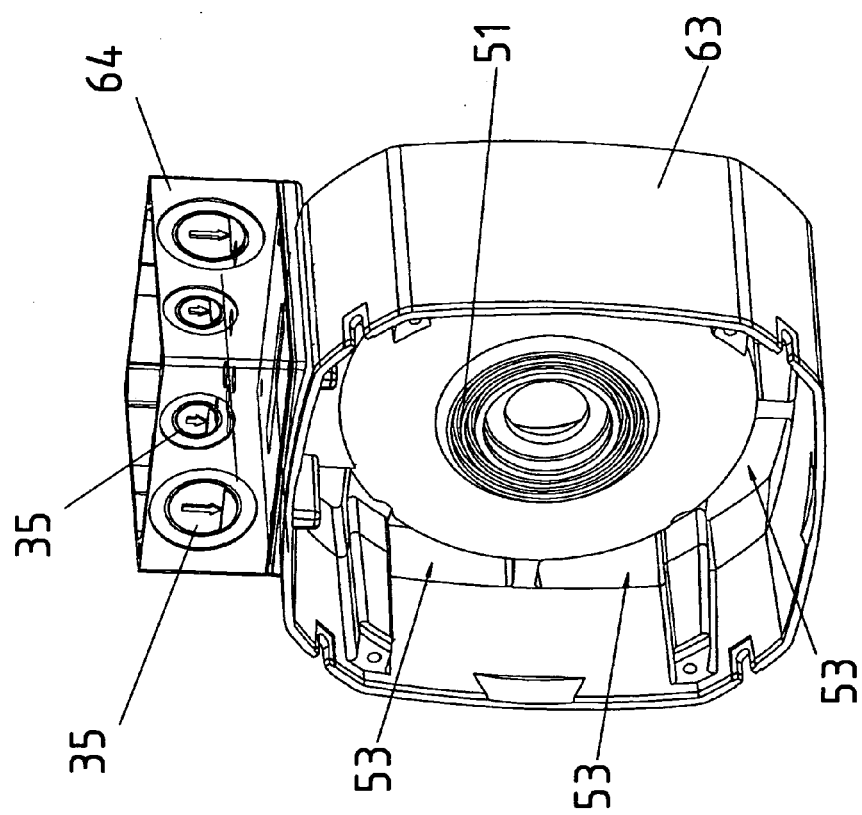

FIGS. 10a and 10b are spatial, oblique front and back views of the bearing support and connected terminal box illustrated in FIGS. 6a and 6b.

Figure 5B:
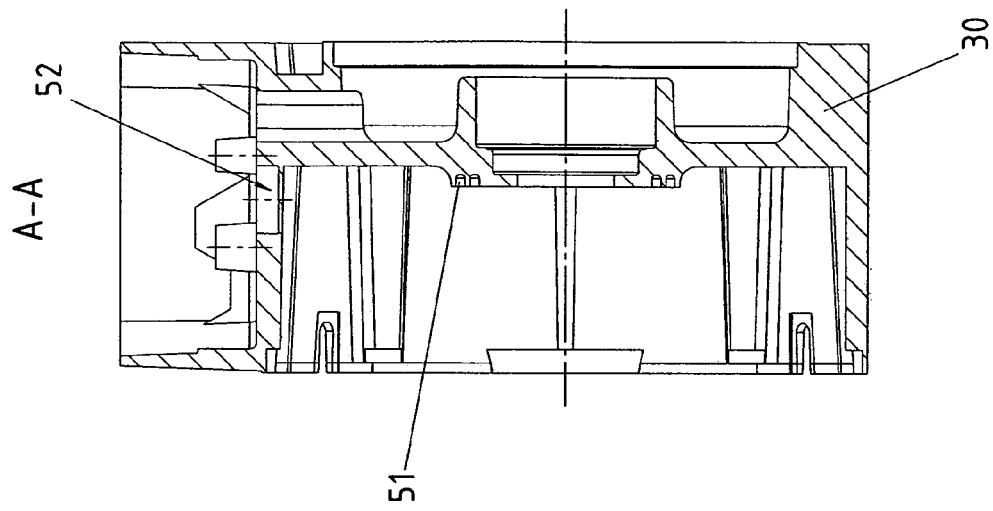
FIGS. 5a and 5b are a plan view and sectional view of a bearing support according to an example embodiment of the present invention.
Figure 5A:
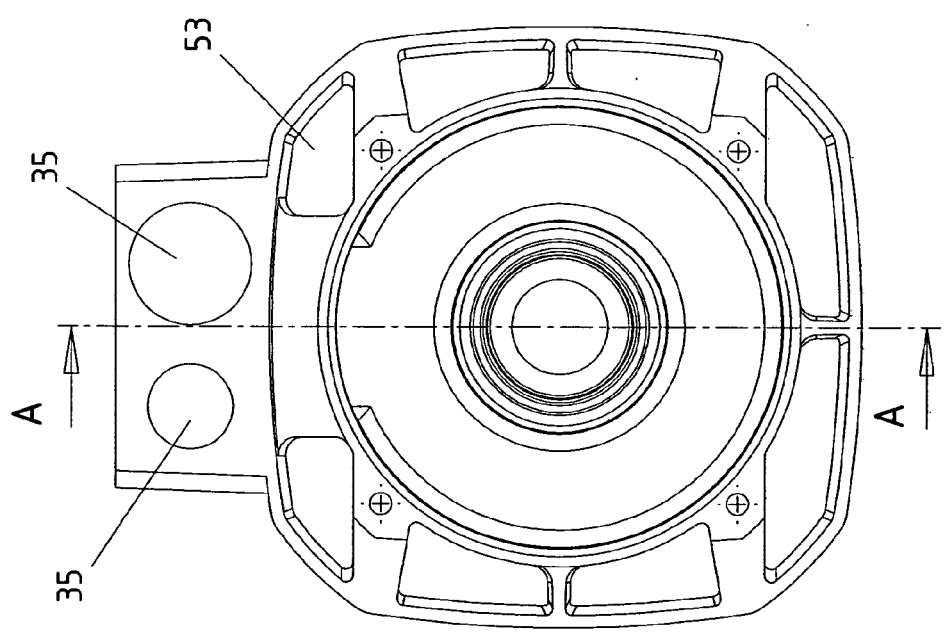
Figure 11A:
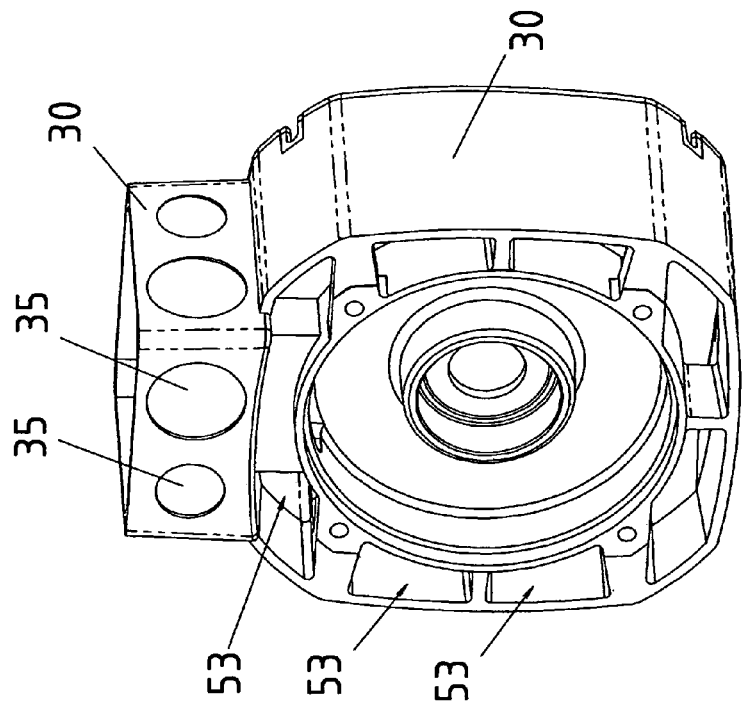
Figure 11B:
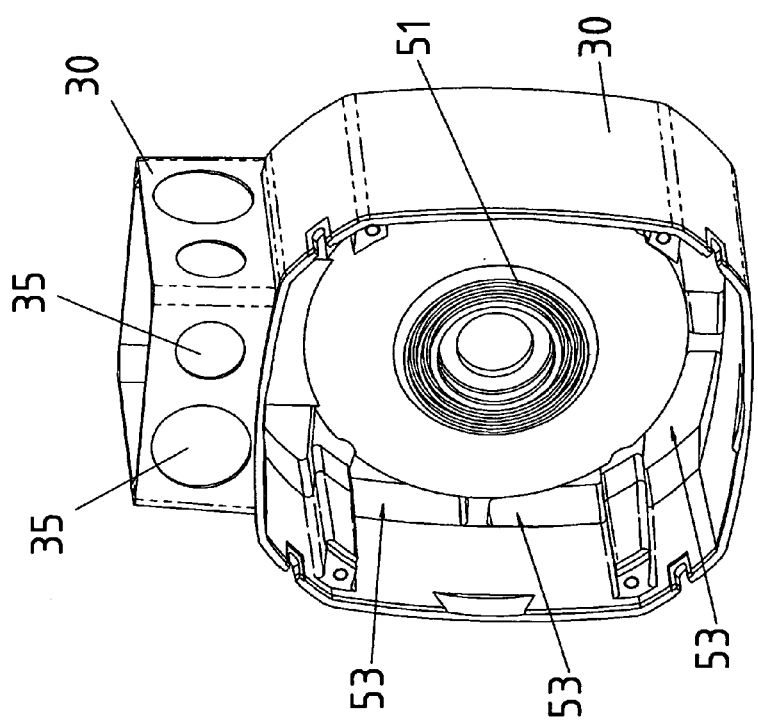

FIGS. 11*a* and 11*b* are spatial, oblique front and back views of the bearing support illustrated in FIGS. 5*a* and 5*b*.

DETAILED DESCRIPTION

Figure 1A:
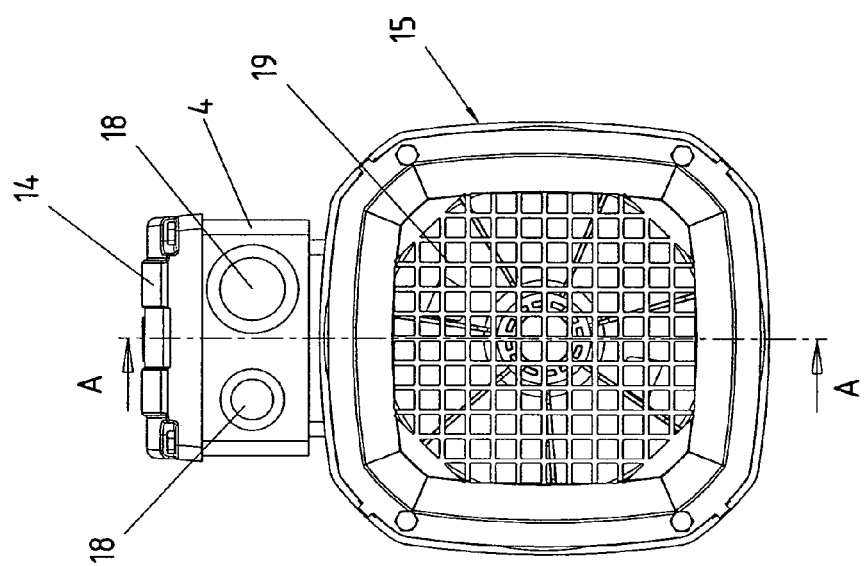
FIGS. 1a and 1b are a plan view and sectional view of an electric motor of an example embodiment of the present invention, having a brake and a fan.
Figure 1B:
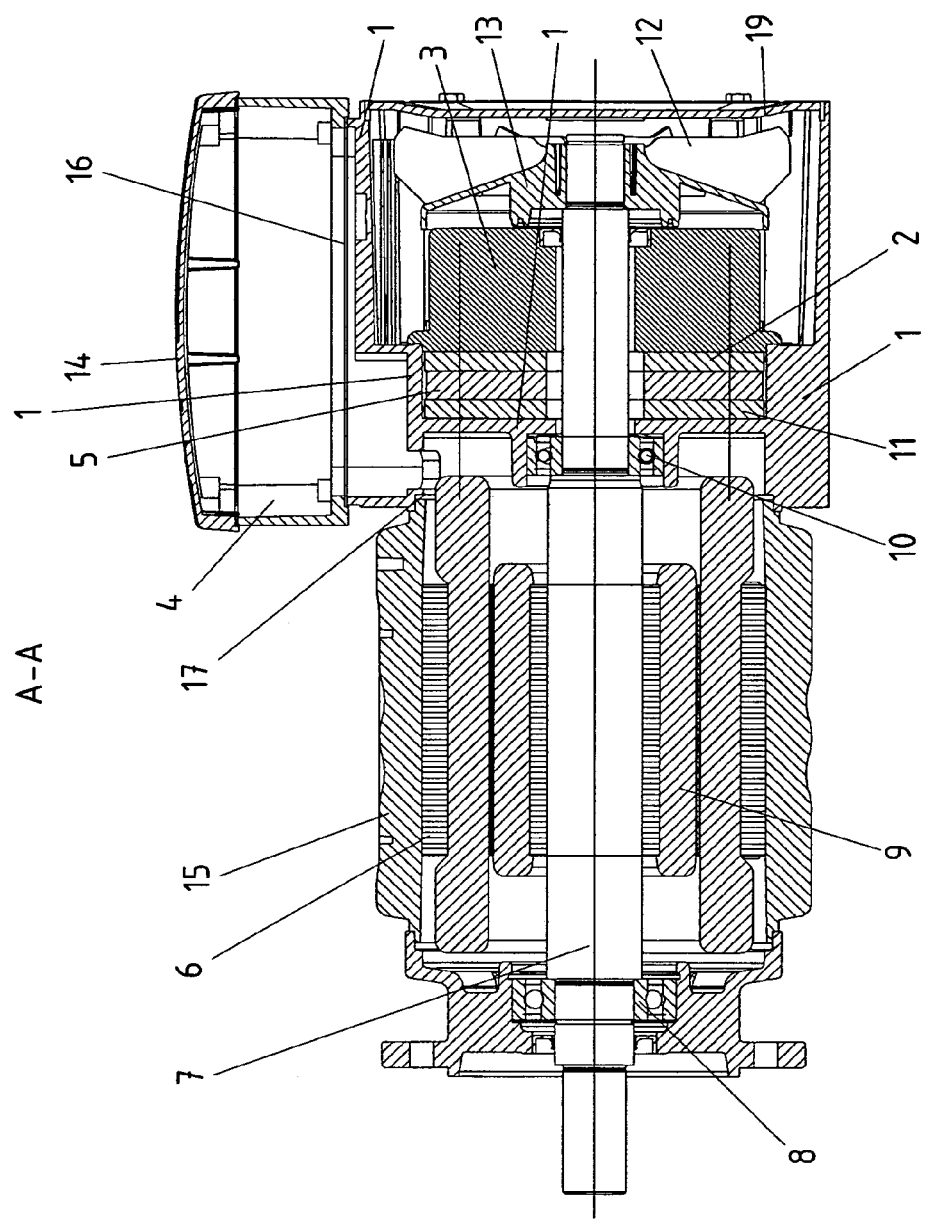

Illustrated in FIGS. 1*a* and 1*b* is the bearing support 1 of an electric motor having a brake. The bearing support has a bearing seat for B-side bearing 10 of the electric motor. The bearing seat is suitably machined for this. The electric motor includes a stator winding 6, which is provided inside housing 15, and a rotor shaft 7, which is supported on the A side by bearing 8 in the A-side bearing support, and on the B side by bearing 10 in the B-side bearing support. Rotor 9, including rotor shaft 7 and rotor plates, is arranged as a squirrel-cage rotor for forming an asynchronous motor. However, the rotor may also be arranged to form a synchronous motor, reluctance motor, or another motor.

On its B-side end, the rotor shaft supports a fan 13 having fan blades 12. Provided axially in front of this is a brake, which includes a brake coil located in magnet body 3 and an axially movable armature disk 2. When current flows through the brake coil, armature disk 2 is pulled towards it, counteracting spring force being overcome by spring elements supported in the magnet body. When no current flows, the spring elements therefore press against the armature disk such that it is pressed onto the coating support, which supports brake coatings on the two axially oriented surfaces. The coating support is also connected to rotor shaft 7 in a form-locked manner in the radial and circumferential directions. Therefore, when no current flows through the brake coil, armature disk 2 presses coating support 5 onto the friction disk 11 positioned axially behind the coating support.

Housing 15 of the electric motor has a mechanical interface to bearing support 1, which means that bearing support 1 is connectible to housing 15 in a sealed, rigid, and exact manner. Bearing support 1 has a correspondingly matching interface.

Bearing support 1 has an additional, electric interface to the terminal box constructed as a connection box. This includes a housing cover 14 and a bottom part 4 of the terminal box, the bottom part being connectible to bearing support 1 in a sealed and rigid manner. A seal 16 is provided in the connection region for this purpose.

The interface between housing 15 and bearing support 1 may also be constructed to provide a sealed connection. Seal 17 is provided for this.

Bottom part 4 of the terminal box has screw-type conduit fittings 18 arranged as cable outlets. As an alternative, screw-type conduit fittings may be provided in the corresponding cover.

Seals 17, 16 may be arranged to function as a heat barrier. Consequently, the exchange of heat between the metallic parts, e.g., housing 15 and bearing support 1, may be sharply reduced. The exchange of heat between the bearing support and the bottom part of the terminal box may be sharply reduced.

An additional measure for reducing this heat exchange is to not make bottom part 4 of the terminal box out of metal, but out of plastic or another thermal insulator. Seal 16 may not only be arrangeable as a flat seal or O-ring, but also as a thermally insulating, injection-molded part, which separates the spatial region of bearing support 1, together with the brake and the fan, from the interior of the bottom part of the terminal box, or also from cover 14.

On the B side, bearing support 1 has an opening for air to pass through. For reasons of safety, it is terminated by a fan-hood grating 19.

As illustrated in FIGS. 1*a* and 1*b*, a seal is also provided between bottom part 4 of the terminal box and corresponding cover 14. It may be arranged to be thermally conductive so that heat from the electronic circuit may be discharged through the cover to not only the environment, but also the bottom part of the terminal box. In this context, heat is conducted via the contact surfaces of bottom part 4 of the terminal box and corresponding cover 14, which extend around the spatial region of the seal itself, the seal being designable as a flat seal, O-ring, etc. Heat may then be discharged by the cover to the bearing support and to the environment, since the bearing support has the function of forming a housing. In contrast to this, the seal may not be thermally conductive, but rather may be arranged as a thermal barrier, whereby for this, the contact surfaces are then designed to be small, and an additional heat barrier may be inserted.

However, seal 16 may also be arranged to be thermally conductive, e.g., metallic contact surfaces provided around the spatial region of the seal may be increased in size, and therefore, a sufficiently large contact surface may be provided which causes a reduction in the heat-transfer resistance. This provides that bearing support 1 and the bottom part of the terminal box are effectively thermally coupled, i.e., they have a low heat-transfer resistance. Therefore, the heat may be discharged by the electronic circuit, through the bottom part of the terminal box, to not only the environment, but also the bearing support. Thus, a specially formed cooling body is not necessary, and on the whole, a smaller volume is necessary, e.g., laterally.

Seal 17 may also be designed to conduct heat. This is advantageous, when the temperature in the stator and the corresponding housing is constantly less than in the region of the bearing support and heat may therefore be conveyed to the stator and its housing. Consequently, the entire electric motor may be designed to be even smaller.

Bearing support 1 may be provided with the two, above-mentioned, specific interfaces. Consequently, components other than those illustrated in FIGS. 1*a* and 1*b* are also alternatively connectible.

It may also be provided that the electronics are arranged not in the axial direction, but rather radially, i.e., laterally. In this context, it may be provided that the overall length may be kept small. In the case of most machines and systems, a certain volume is available on the side and accessible to the operator, since the connection box of the motor lies mostly on the side and the overall length is more expensive with regard to the total cost. The laterally available volume is utilized, and the increase in volume needed in the lateral direction is insignificant. In particular, cooling with the aid of a fan allows the electronics to be manufactured to be small and therefore produces a small lateral volume. In addition, the cooling body may be arranged to be small, or may be neglected, since heat is discharged through the bearing support of the motor and discharged from it to the environment, via the stream of cooling air driven by the fan.

As illustrated in FIGS. 2*a* and 2*b*, instead of bottom part 4 of the terminal box, a differently formed bottom part 26 is put on and connected in a sealed, detachable manner. It juts out in the direction of the motor. This provides space for signal electronics and power electronics in the interior of bottom part 26 and housing cover 25. The power supply cable and also signal lines and bus lines, e.g., field-bus lines, are led through screw-type conduit fittings 20, which means that the entire electric motor may be arranged to have a high degree of protection, e.g., at least IP65, as does the electric motor illustrated in FIGS. 1*a* and 1*b* as well.

Connection terminals 22 are provided on a printed circuit board 23, which is provided in the interior of lower part 26.

A further feature is that the axial end of the cover and of bottom part 26 is terminated in substantially the same axial position as the fan hood.

Provided in the interior is a printed circuit board 21 that is detachably connected to the housing cover. It supports the signal electronics.

A printed circuit board 23 having power electronics 27 is arranged in bottom part 26, the printed circuit board supporting a plug-and-socket connector for an electrical plug connection to a further plug-and-socket connector, the further plug-and-socket connector being connected to printed circuit board 21. Power electronics 27 are connected to bearing support 1 in a thermally conductive manner. For this purpose, the bearing support has a precision-machined surface that may be used as a contact surface. Heat-conduction paste may also be added to improve the heat-transfer resistance.

Therefore, bearing support 1 is manufactured to be a multifunctional part. Thus, it not only has the above-mentioned mechanical interfaces, but is also used for discharging the heat of the power electronics to the environment. To improve this dissipation of heat, it may be provided that the fan additionally and actively supplies the bearing support with cooling air from the environment. Consequently, not only the stator of the electric motor, but also power electronics 27 may be cooled.

The signal electronics and power electronics are manufactured together as a converter. Consequently, the stator of the electric motor may be powered by this converter, and the entire electric motor is thus controllable from the converter. The converter may be powered by three-phase current.

The power electronics include at least the rectifier and the output stage controllable in a pulse-width-modulated manner, i.e., the inverter, which generates, from the rectified voltage, an a.c. voltage having a frequency predefined by the control electronics. The corresponding electronic circuit breakers give off the heat generated by them to a support, which is connected to bearing support 1 in a thermally conductive manner. The support is mechanically connectible to the bearing support, e.g., in a force-locked manner.

The power electronics may be connected to the cover in a thermally conductive manner, the cover having a contact surface suitable for heat transfer.

The same stator with housing 15 is illustrated in FIGS. 3a and 3b, but a different bearing support 30 is connected. Bearing support 30 has the same interface to the stator and to housing 15. However, the terminal box is constructed in one piece with bearing support 30. This may reduce the manufacturing costs. A housing cover 31 is provided. Since no brake is provided, and because of the one-piece arrangement and the omission of fasteners associated with this, the electric motor as a whole may be manufactured to be much more compact.

Fan-hood grating 32 may be manufactured to be substantially identical to fan-hood grating 19 illustrated in FIGS. 1a, 1b, 2a, and 2b.

Labyrinth seal 33 and shaft sealing ring 34 allow manufacturability with a high degree of protection, e.g., at least IP65. Labyrinth seal 33 makes a seal between the bearing support and the rotating fan, the occurring friction losses being very small. Shaft sealing ring 34 may improve the sealing function considerably. The one-piece formation of the bottom part of a terminal box may allow a high degree of imperviousness and protection to be achieved in a cost-effective manner, using simple arrangements.

Another variant is illustrated in FIGS. 4a and 4b. In this context, bearing support 30 of FIGS. 3a and 3b is reused. The stator and housing 15 are also the same. However, a sensor is provided, which is mechanically and detachably connected to the bearing support and electrically connected to an electronic circuit that may be provided in the interior region or exterior region of the terminal box. In the case last mentioned, the signal lines of the sensor are led out through screw-type conduit fittings 35 of the terminal box. The sensor detects magnetic foil 41, which is applied to the fan and is provided with an alternating direction of magnetization at the circumference. As an alternative, a plastic-bonded ferrite having an alternating direction of magnetization may be provided.

A series of electric motors is provided, which allows different variants to be produced as a function of the application of the motor, where, however, as many parts as possible are reusable within this modular system. For example, the same stator, together with housing 15, is connectible to different bearing supports, a first bearing support including a brake and a fan, and a second bearing support only including a fan. In addition, the first bearing support is connectible, with the aid of its upwardly directed interface, to a terminal box, i.e., connection box, or to a converter or to a different electronic device.

Illustrated in FIGS. 5a and 5b are a plan view and sectional view of a bearing support, a terminal box being cast integrally. In this context, the bearing support has depressions 51 for a labyrinth seal. Knockout 52 is present after the manufacture of the bearing support and is easily removable in a simple manner, when an opening is necessary for accommodating the sensor. Mere pressing with a tool is sufficient. The cooling air heated by the bearing support flows through cut-outs 53.

An alternative bearing support 63 is illustrated in FIGS. 6a and 6b, terminal box 64 being formed separately. A seal 61 is inserted to produce a sealed connection to bearing support 63. In addition, the terminal box is formed at the interface to the bearing support such that a keyed connection is provided, which simultaneously protects the seal, i.e., the function of forming the housing for it is also implemented.

Provided for mounting a sensor are knockouts 62, which may be manufactured inexpensively and are easily removable during the mounting.

Spatial, oblique views from the front and back, which belong to bearing support 63 illustrated in FIGS. 6a and 6b, are illustrated in FIGS. 10a and 10b. Mounted and detachably connected terminal box 64 is illustrated as well. Cut-outs 53 for letting air through are illustrated. The fan grating, where the air is sucked in, is not illustrated. The air then flows out at the other axial end of bearing support 63 such that the air stream is directed through housing 15 of the electric motor and also has a cooling effect there for dissipating heat.

Spatial, oblique views from the front and back, which belong to bearing support 30 illustrated in FIGS. 5a and 5b, are illustrated in FIGS. 11a and 11b. Cut-outs 53 for letting air through are illustrated. The fan grating, where the air is sucked in, is not illustrated. The air then flows out at the other axial end of bearing support 63 such that the air stream is directed through housing 15 of the electric motor and also has a cooling effect there for dissipating heat.

As illustrated in FIGS. 7a and 7b, the electric motor is provided with a fan, but without a brake. The terminal box is screwed onto bearing support 63 and, with the aid of seal 61, it is connected to form a seal. Cover 31 is put onto terminal box 64 and connected to it so as to form a seal, terminal box 64 including screw-type conduit fittings 35.

An electric motor, which is manufactured to be similar to the one illustrated in FIGS. 7a and 7b, is illustrated in FIGS.

8a and 8b. However, knockouts 62 are removed and sensor 40 is inserted. The sensor is mounted so as to be vertically adjustable. This is implemented, for example, with the aid of two lock nuts. However, other methods may be used for vertical adjustment as well. Sensor 40 is therefore adjustable to the optimum distance from the fan and may thus generate pulses per revolution in accordance with the sensor vanes or fan blades.

An electric motor, which is manufactured to be similar to the one illustrated in FIGS. 7a and 7b, is illustrated in FIGS. 9a and 9b. However, instead of the terminal box, a bottom part 91 is mounted on bearing support 63. A housing cover 14 is put onto bottom part 91. An electronic circuit, as is also mentioned in the description of FIGS. 2a and 2b, may be provided in the interior chamber surrounded by bottom part 91 and housing cover 14. Thus, a converter, a soft-start circuit, a motor switch, or another electronic circuit may be implemented.

The sensor may be directly mounted to printed circuit board 23, and the printed circuit board may be able to be positioned very accurately. Therefore, this arrangement directly allows the sensor to detect the alternating direction of magnetization at the fan. Information regarding the rotational speed and direction of rotation may be derived from the sensor signals. This allows the electric motor to be controlled and/or regulated in an improved manner.

The signal electronics and power electronics may not take the form of a converter, but rather a soft-start device, i.e., starter. This allows costs to be reduced.

As an alternative, the signal electronics and power electronics may be arranged as a switch for switching the motor on and off, the switch being able to be implemented electromechanically or electronically.

Other motor electronics may also be provided as signal electronics and power electronics. For example, the motor electronics may be arranged as a voltage-adjustment module for the motor and/or the brake, or as a broad-voltage module for the motor and/or the brake.

At least a part of the power electronics may be connected to the cover in a thermally conductive manner. To this end, the inner side of the cover may be machined such that the heat from the power electronics may be transferred to it. This connection may be implemented in a force-locked manner. However, other types of connections may also be provided.

The signal electronics may also include powerline electronics. This means that the electronic circuit is able to modulate information onto the supply lines, e.g., power cables, using, in particular, a frequency much higher than, e.g., 50 Hz. For example, frequencies between 10 kHz and 10 MHz may be suitable.

The bearing support may be formed of diecast aluminum. However, it may be provided to make the bearing support out of thermally conductive ceramic. Therefore, a low-wear friction surface may be provided for the brake, the heat of the friction surface generated during braking being able to be removed quickly and easily from the bearing support.

It is also possible to make only the friction surface out of ceramic.

The bearing support may also be made of cast iron, e.g., gray cast iron.

What is claimed is:

1. An electric motor, comprising:
   a stator;
   a rotor including a rotor shaft;
   a bearing support including a bearing seat for a B side bearing of the rotor shaft; and
   a housing including at least one first mechanical interface adapted to connect to the bearing support;
   wherein the bearing support includes a further interface adapted to connect directly to a bottom part, the bearing support forming a cup-shaped housing for a brake and a fan and extending beyond the brake and the fan in an axial direction away from the B-side bearing, the cup-shaped housing terminated on one end by the B-side bearing and the rotor shaft and terminated on an opposite end by an approximately planar grating, the terminated cup-shaped housing enclosing the brake and the fan, the bottom part having an interface adapted to connect to a cover, the bottom part forming a housing for at least power electronics, heat from the power electronics dischargeable one of (a) directly and (b) at least indirectly to the bottom part, the bottom part thermally conductively connected to the bearing support to discharge the heat of the power electronics by the bearing support to surrounding air.

2. The electric motor according to claim 1, further comprising a seal arranged between the bearing support and the housing assigned to the stator.

3. The electric motor according to claim 1, wherein the power electronics are thermally conductively connected to the cover at a contact surface.

4. The electric motor according to claim 1, wherein the cover is thermally conductively connected to the bearing support by the bottom part to discharge heat from the power electronics to the surrounding air.

5. The electric motor according to claim 1, wherein an air stream of the fan is adapted to cool the bearing support.

6. The electric motor according to claim 1, wherein the bearing support is adapted to discharge heat to an environment.

7. The electric motor according to claim 1, wherein the bearing support includes cut-outs, a stream of cooling air directable through the cut-outs.

8. The electric motor according to claim 1, wherein the bearing support is shaped to be suitable to direct air of an air stream of the fan.

9. The electric motor according to claim 1, wherein the bearing support includes at least one of (a) connection terminals and (b) centering devices for at least one of (a) additional units and (b) additional devices positionable on the B side.

10. The electric motor according to claim 9, wherein at least one of (a) the additional units and (b) the additional devices include at least one rotating component one of (a) directly and (b) indirectly connectible to the rotor shaft of the electric motor and at least one non-rotating component at least one of (a) connectible to the bearing support and (b) centerable on the bearing support.

11. The electric motor according to claim 9, wherein at least one of (a) the additional units and (b) the additional devices include angular-position sensors.

12. The electric motor according to claim 1, wherein the bottom part and the cover are adapted to form a housing for a sensor adapted to detect at least one physical characteristic of at least one of (a) a rotationally mounted part of the electric motor and (b) a fan blade.

* * * * *